(12) United States Patent
Zhuang et al.

(10) Patent No.: US 10,812,368 B2
(45) Date of Patent: Oct. 20, 2020

(54) METHOD AND APPARATUS FOR CONTROLLING NETWORK TRAFFIC PATH

(71) Applicant: Huawei Technologies Co., Ltd., Shenzhen (CN)

(72) Inventors: Shunwan Zhuang, Shenzhen (CN); Changjiang Yan, Shenzhen (CN); Fengqing Yu, Shenzhen (CN); Fei Chen, Shenzhen (CN); Lili Wang, Shenzhen (CN); Yuanbin Ouyang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/094,621

(22) Filed: Apr. 8, 2016

(65) Prior Publication Data

US 2016/0226750 A1   Aug. 4, 2016

Related U.S. Application Data

(63) Continuation of application No. PCT/CN2014/087487, filed on Sep. 26, 2014.

(30) Foreign Application Priority Data

Oct. 11, 2013   (CN) .......................... 2013 1 0474162

(51) Int. Cl.
*H04L 12/715*   (2013.01)
*H04L 12/751*   (2013.01)
(Continued)

(52) U.S. Cl.
CPC .............. *H04L 45/04* (2013.01); *H04L 45/02* (2013.01); *H04L 45/123* (2013.01); *H04L 45/20* (2013.01); *H04L 45/42* (2013.01)

(58) Field of Classification Search
CPC .......... H04L 45/02; H04L 45/04; H04L 45/20; H04L 45/123
See application file for complete search history.

(56) References Cited

U.S. PATENT DOCUMENTS

| 2006/0291446 A1 | 12/2006 | Caldwell et al. |
| 2008/0101392 A1 | 5/2008 | Zhang et al. |
(Continued)

FOREIGN PATENT DOCUMENTS

| CN | 1479496 A | 3/2004 |
| CN | 1893419 A | 1/2007 |
(Continued)

OTHER PUBLICATIONS

Bates et al., "BGP Route Reflection: An Alternative to Full Mesh Internal BGP (IBGP)," Network Working Group, Request for Comments: 4456, pp. 1-12, IETF Trust, Reston, Virginia (Apr. 2006).

(Continued)

*Primary Examiner* — Kodzovi Acolatse
*Assistant Examiner* — Farhad Ali
(74) *Attorney, Agent, or Firm* — Leydig, Voit & Mayer, Ltd.

(57) ABSTRACT

The present disclosure discloses a method and an apparatus for controlling a network traffic path. The method includes: receiving routing advertisement information from a first network to a second network; determining all routing nodes included in a path through which data pass when flowing from the second network to the first network according to the routing advertisement information; and configuring a next hop routing node for each determined routing node, where the next hop routing node is a node in all the routing nodes included in the path and is adjacent to the routing node for which the next hop routing node is configured, and the routing node for which the next hop routing node is con- (Continued)

figured does not include a routing node of the first network or a routing node of the second network.

20 Claims, 6 Drawing Sheets

(51) Int. Cl.
*H04L 12/721* (2013.01)
*H04L 12/717* (2013.01)
*H04L 12/733* (2013.01)

(56) References Cited

U.S. PATENT DOCUMENTS

| | | | |
|---|---|---|---|
| 2011/0261825 A1 | 10/2011 | Ichino | |
| 2012/0087377 A1 | 4/2012 | Lai | |
| 2012/0102228 A1* | 4/2012 | Cugini | H04L 45/04 709/242 |
| 2013/0259465 A1 | 10/2013 | Blair | |
| 2014/0334286 A1* | 11/2014 | Ernstrom | H04L 45/04 370/216 |

FOREIGN PATENT DOCUMENTS

| | | |
|---|---|---|
| CN | 101076029 A | 11/2007 |
| CN | 102273133 A | 12/2011 |
| EP | 2487844 A1 | 8/2012 |
| WO | WO 2007047867 A2 | 4/2007 |
| WO | WO 2010105698 A1 | 9/2010 |

OTHER PUBLICATIONS

Lougheed et al., "A Border Gateway Protocol (BGP)," Network Working Group, Request for Comments: 1105, pp. 1-17, IETF Trust, Reston, Virginia (Jun. 1989).

Lougheed et al., "A Border Gateway Protocol (BGP)," Network Working Group, Request for Comments: 1163, pp. 1-29, IETF Trust, Reston, Virginia (Jun. 1990).

Lougheed et al., "A Border Gateway Protocol 3 (BGP-3)," Network Working Group, Request for Comments: 1267, pp. 1-35, IETF Trust, REston, Virginia (Oct. 1991).

Rekhter et al., "A Border Gateway Protocol 4 (BGP-4)," Network Working Group, Request for Comments: 4271, pp. 1-104, IETF Trust, Reston, Virginia (Jan. 2006).

Scudder et al., "Capabilities Advertisement with BGP-4," Network Working Group, Request for Comments: 5492, pp. 1-7, IETF Trust, Reston, Virginia (Feb. 2009).

Verkaik et al., "Wresting Control from BGP: Scalable Fine-grained Route Control," USENIX Annual Technical Conference, Santa Clara, California, pp. 295-308, USENIX Association, Berkeley, California (Jun. 17-22, 2007).

Walton et al., "Advertisement of Multiple Paths in BGP," Network Working Group, Internet Draft, draft-ietf-idr-add-paths-07.txt, pp. 0-8, IETF Trust, Reston, Virginia (Jun. 17, 2012).

Ross et al., "Point-toPoint Routing in the Internet," pp. 1-10, http://www2.ic.uff.br/~michael/kr1999/4-network/4_05-routinet.htm (Jan. 12, 2004).

\* cited by examiner

METHOD AND APPARATUS FOR CONTROLLING NETWORK TRAFFIC PATH

CROSS-REFERENCE TO RELATED APPLICATIONS

This application is a continuation of International Patent Application No. PCT/CN2014/087487, filed on Sep. 26, 2014, which claims priority to Chinese Patent Application No. 201310474162.4, filed on Oct. 11, 2013, both of which are hereby incorporated by reference in their entireties.

TECHNICAL FIELD

The present disclosure relates to the field of computer technologies, and in particular, to a method and an apparatus for controlling a network traffic path.

BACKGROUND

A border gateway protocol (BGP) is a dynamic routing protocol used between autonomous systems (AS). BGP speakers interchanging messages call each other a peer. A BGP speaker only advertises routing used by the BGP speaker to a peer, so that when data flow from the BGP speaker to the peer, only a data ingress routing node connected to the BGP speaker and a data egress routing node connected to the peer may be configured.

In the prior art, a routing node through which data pass when flowing from the data ingress routing node to the data egress routing node is selected by a route reflector. All routing nodes between the data ingress routing node and the data egress routing node are neighbor nodes of the route reflector, resulting in a technical problem that, when the routing node through which data pass when flowing from the data ingress routing node to the data egress routing node is selected, and when the route reflector selects a next hop routing node of a routing node, the next hop routing node is not adjacent to the selected routing node, and thus an adjacent node cannot be selected as the next hop routing node of the routing node neighbor by neighbor.

SUMMARY

Embodiments of the present application provide a method and an apparatus for controlling a network traffic path, so as to solve a technical problem in the prior art that an adjacent node cannot be selected as a next hop routing node of a routing node neighbor by neighbor.

According to a first aspect of the present disclosure, a method for controlling a network traffic path is provided, including: receiving routing advertisement information from a first network to a second network; determining all routing nodes included in a path through which data pass when flowing from the second network to the first network according to the routing advertisement information; and configuring a next hop routing node for each determined routing node, where the next hop routing node is a node in all the routing nodes included in the path and is adjacent to the routing node for which the next hop routing node is configured, and the routing node for which the next hop routing node is configured is not a routing node of the first network or a routing node of the second network.

With reference to the first aspect, in a first possible implementation manner, the determining all the routing nodes included in the path through which the data pass when flowing from the second network to the first network according to the routing advertisement information specifically includes: determining all the routing nodes included in the path through which the data pass when flowing from the second network to the first network according to the routing advertisement information and received routing plan information between the first network and the second network, where plan nodes in the routing plan information include N routing node between the first network and the second network, and the determined routing nodes include the N routing node, and N is a positive integer.

With reference to the first possible implementation manner of the first aspect, in a second possible implementation manner, the determining all the routing nodes included in the path through which the data pass when flowing from the second network to the first network according to the routing advertisement information and the received routing plan information between the first network and the second network specifically includes: determining a routing node through which the data pass when flowing from the second network to the first network and conforming to a preset constraint condition according to the routing advertisement information and the received routing plan information between the first network and the second network.

With reference to the second possible implementation manner of the first aspect, in a third possible implementation manner, the determining the routing node through which the data pass when flowing from the second network to the first network and conforming to the preset constraint condition according to the routing advertisement information and the received routing plan information between the first network and the second network specifically includes: selecting a routing node connected to the second network; executing the following operations for each selected routing node until the selected routing node is connected to the first network: determining whether a routing node in the N routing node exists in routing nodes connected to the selected routing node; when determining that the routing node in the N routing node exists in the routing nodes connected to the selected routing node, selecting the routing node in the N routing node as a next hop routing node; when determining that the routing node in the N routing node does not exist in the routing nodes connected to the selected routing node, selecting a routing node conforming to the preset constraint condition from the routing nodes connected to the selected routing node as a next hop routing node.

With reference to the first aspect, in a fourth possible implementation manner, the determining all the routing nodes included in the path through which the data pass when flowing from the second network to the first network according to the routing advertisement information specifically includes: determining a routing node through which the data pass when flowing from the second network to the first network and conforming to a preset constraint condition according to the routing advertisement information.

With reference to the fourth possible implementation manner of the first aspect, in a fifth possible implementation manner, the determining the routing node through which the data pass when flowing from the second network to the first network and conforming to the preset constraint condition according to the routing advertisement information includes: selecting a routing node connected to the second network; executing the following operation for each selected routing node until the selected routing node is connected to the first network: selecting a routing node conforming to the preset constraint condition from routing nodes connected to the selected routing node as a next hop routing node.

With reference to the third or the fifth possible implementation manner of the first aspect, in a sixth possible implementation manner, selecting the next hop routing node conforming to the preset constraint condition from the routing nodes connected to the selected routing node includes: when data of a plurality of the second networks need to be transmitted to the first network, for the second network, selecting a routing node conforming to the preset constraint condition from all unselected routing nodes connected to the selected routing node as the next hop routing node.

A second aspect of the present disclosure provides an apparatus for controlling a network traffic path, including: a receiving unit, configured to receive routing advertisement information from a first network to a second network; a routing determining unit, configured to receive the routing advertisement information sent by the receiving unit, and determine all routing nodes included in a path through which data pass when flowing from the second network to the first network according to the routing advertisement information; and a configuring unit, configured to receive all the determined routing nodes sent by the routing determining unit, and configure a next hop routing node for each determined routing node, where the next hop routing node is a node in all the routing nodes included in the path and is adjacent to the routing node for which the next hop routing node is configured, and the routing node for which the next hop routing node is configured is not a routing node of the first network or a routing node of the second network.

With reference to the second aspect, in a first possible implementation manner, the routing determining unit includes a first routing determining subunit, configured to determine all the routing nodes included in the path through which the data pass when flowing from the second network to the first network according to the routing advertisement information and received routing plan information between the first network and the second network, where plan nodes in the routing plan information include N routing node between the first network and the second network, and the determined routing nodes include the N routing node, and N is a positive integer.

With reference to the first possible implementation manner of the second aspect, in a second possible implementation manner, the first routing determining subunit is specifically configured to determine a routing node through which the data pass when flowing from the second network to the first network and conforming to a preset constraint condition according to the routing advertisement information and the received routing plan information between the first network and the second network.

With reference to the second possible implementation manner of the second aspect, in a third possible implementation manner, the first routing determining subunit is specifically configured to select a routing node connected to the second network, execute the following operations for each selected routing node until the selected routing node is connected to the first network, determine whether a routing node in the N routing node exists in routing nodes connected to the selected routing node, when determining that the routing node in the N routing node exists in the routing nodes connected to the selected routing node, select the routing node in the N routing node as a next hop routing node, when determining that the routing node in the N routing node does not exist in the routing nodes connected to the selected routing node, select a routing node conforming to the preset constraint condition from the routing nodes connected to the selected routing node as a next hop routing node.

With reference to the second aspect, in a fourth possible implementation manner, the routing determining unit includes a second routing determining subunit, configured to determine a routing node through which the data pass when flowing from the second network to the first network and conforming to a preset constraint condition according to the routing advertisement information.

With reference to the fourth possible implementation manner of the second aspect, in a fifth possible implementation manner, the second routing determining subunit is specifically configured to select a routing node connected to the second network, execute the following operation for each selected routing node until the selected routing node is connected to the first network, select a routing node conforming to the preset constraint condition from routing nodes connected to the selected routing node as a next hop routing node.

With reference to the third or fifth possible implementation manner of the second aspect, in the sixth possible implementation manner, the configuring unit is further configured to, when data of a plurality of the second networks need to be transmitted to the first network, for the second network, select a routing node conforming to the preset constraint condition from all unselected routing nodes connected to the selected routing node as the next hop routing node.

A third aspect of the present disclosure provides an apparatus for controlling a network traffic path, including: a receiver, configured to receive routing advertisement information from a first network to a second network; a controller, configured to determine all routing nodes included in a path through which data pass when flowing from the second network to the first network according to the routing advertisement information, and configure a next hop routing node for each determined routing node, where the next hop routing node is a node in all the routing nodes included in the path and is adjacent to the routing node for which the next hop routing node is configured, and the routing node for which the next hop routing node is configured does not include a routing node of the first network or a routing node of the second network.

With reference to the third aspect, in a first possible implementation manner, the controller is specifically configured to determine all the routing nodes included in the path through which the data pass when flowing from the second network to the first network according to the routing advertisement information and received routing plan information between the first network and the second network, where plan nodes in the routing plan information include N routing node between the first network and the second network, and the determined routing nodes include the N routing node, and N is a positive integer.

With reference to the first possible implementation manner of the third aspect, in a second possible implementation manner, the controller is specifically configured to determine a routing node through which the data pass when flowing from the second network to the first network and conforming to a preset constraint condition according to the routing advertisement information and the received routing plan information between the first network and the second network.

With reference to the second possible implementation manner of the third aspect, in a third possible implementation manner, the controller is specifically configured to select a routing node connected to the second network, execute the following operations for each selected routing node until the selected routing node is connected to the first network, determine whether a routing node in the N routing node exists in routing nodes connected to the selected routing node, when determining that a routing node in the N routing node exists, select a routing node in the N routing node as a next hop routing node, when determining that a routing node in the N routing node does not exist, select a routing node conforming to the preset constraint condition from the routing nodes connected to the selected routing node as a next hop routing node.

With reference to the third aspect, in a fourth possible implementation manner, the controller is further configured to determine a routing node through which the data pass when flowing from the second network to the first network and conforming to a preset constraint condition according to the routing advertisement information.

With reference to the fourth possible implementation manner of the third aspect, in a fifth possible implementation manner, the controller is specifically configured to select a routing node connected to the second network, execute the following operation for each selected routing node until the selected routing node is connected to the first network, select a routing node conforming to the preset constraint condition from routing nodes connected to the selected routing node as a next hop routing node.

With reference to the third or fifth possible implementation manner of the third aspect, in a sixth possible implementation manner, the controller is further configured to, when data of a plurality of the second networks need to be transmitted to the first network, for the second network, select a routing node conforming to the preset constraint condition from all unselected routing nodes connected to the selected routing node as the next hop routing node.

The present disclosure has the following beneficial effects.

In the embodiments of the present disclosure, technical solutions of the present application include: receiving the routing advertisement information from the first network to the second network, determining all the routing nodes included in the path through which the data pass when flowing from the second network to the first network according to the routing advertisement information, and configuring the next hop routing node for each determined routing node. Since the next hop routing node is configured for each determined routing node in the technical solutions of the present application, when the data arrive at each determined routing node, the data will be automatically transmitted to the next hop routing node, and thus the technical problem in the prior art that the adjacent node cannot be selected as the next hop routing node of the routing node neighbor by neighbor is solved.

DESCRIPTION OF EMBODIMENTS

In view of a technical problem in the prior art that a routing node cannot be selected neighbor by neighbor, a technical solution provided by an embodiment of the present disclosure includes: receiving routing advertisement information from a first network to a second network, determining all routing nodes included in a path through which data pass when flowing from the second network to the first network according to the routing advertisement information, and configuring a next hop routing node for each determined routing node, so that when the dada arrive at the each determined routing node, the data may be automatically transmitted to the next hop routing node, thus a technical problem in the prior art that an adjacent node cannot be selected as a next hop routing node of a routing node neighbor by neighbor is solved, and a technical effect of selecting the next hop routing node of the routing node as the adjacent node neighbor by neighbor is achieved. Since the adjacent node may be selected as the next hop routing node of the routing node neighbor by neighbor, when a network traffic in a routing node is heavier, the routing node may be excluded from the determined routing nodes, and thus fine and flexible traffic dispersion may be achieved.

Main achievement principles, specific implementation manners and corresponding achievable beneficial effects of technical solutions of embodiments of the present disclosure will be illustrated below in detail in combination with the accompanying drawings.

Embodiment 1

Figure 1:
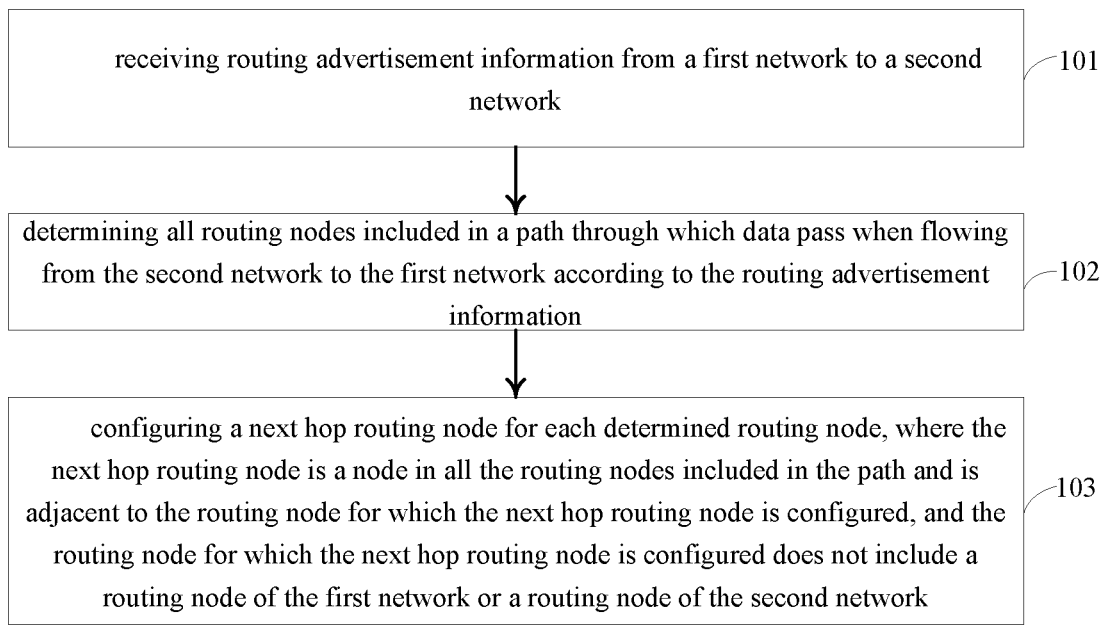
FIG. 1 is a first flowchart of a method for controlling a network traffic path in an embodiment of the present disclosure.

A first embodiment of the present disclosure provides a method for controlling a network traffic path, and as shown in FIG. 1, specific processing procedures of the method is as follows:

step 101: receiving routing advertisement information from a first network to a second network;

step 102: determining all routing nodes included in a path through which data pass when flowing from the second network to the first network according to the routing advertisement information; and step 103: configuring a next hop routing node for each determined routing node, where the next hop routing node is a node in all the routing nodes included in the path and is adjacent to the routing node for which the next hop routing node is configured, and the routing node for which the next hop routing node is configured does not include a routing node of the first network or a routing node of the second network.

In step 101, the routing advertisement information from the first network to the second network is received. In a specific implementation process, for example, the first network and the second network are metropolitan area networks, the two metropolitan area networks communicate through a backbone network, for example, a metropolitan area network of Chengdu and a metropolitan area network of Beijing are connected through a 163 backbone network, and when the first network performs routing advertisement to the second network, routing advertisement information generated when the first network performs the routing advertisement to the second network is received.

For example, taking it as an example that the first network is a metropolitan area network A and the second network is a metropolitan area network B, when the metropolitan area network A performs routing advertisement to the metropolitan area network B, the metropolitan area network A performs routing advertisement on an IP of the metropolitan area network A, for example, 200.1.1.240, 200.1.1.244, 200.1.2.240, 200.1.2.244, 200.1.3.240, or the like, to the metropolitan area network B, and routing advertisement information generated when the metropolitan area network A performs routing advertisement to the metropolitan area network B, including an IP address of the metropolitan area network A and an IP address of the metropolitan area network B, and/or, IP addresses of all routing nodes through which data pass when flowing from the metropolitan area network A to the metropolitan area network B, is received.

Then, step 102 is executed, in the step, all the routing nodes included in the path through which the data pass when flowing from the second network to the first network are determined according to the routing advertisement information.

In a specific implementation process, all the routing nodes through which the data pass when flowing from the second network to the first network may be obtained according to the routing advertisement information, and a path is selected from all the routing nodes, so that the data may be transmitted from the second network to the first network through the path.

Specifically, since the data flow from the second network to the first network, all the determined routing nodes absolutely include the routing node of the first network and the routing node of the second network, and the routing node of the first network may be determined as a destination node.

Figure 2:
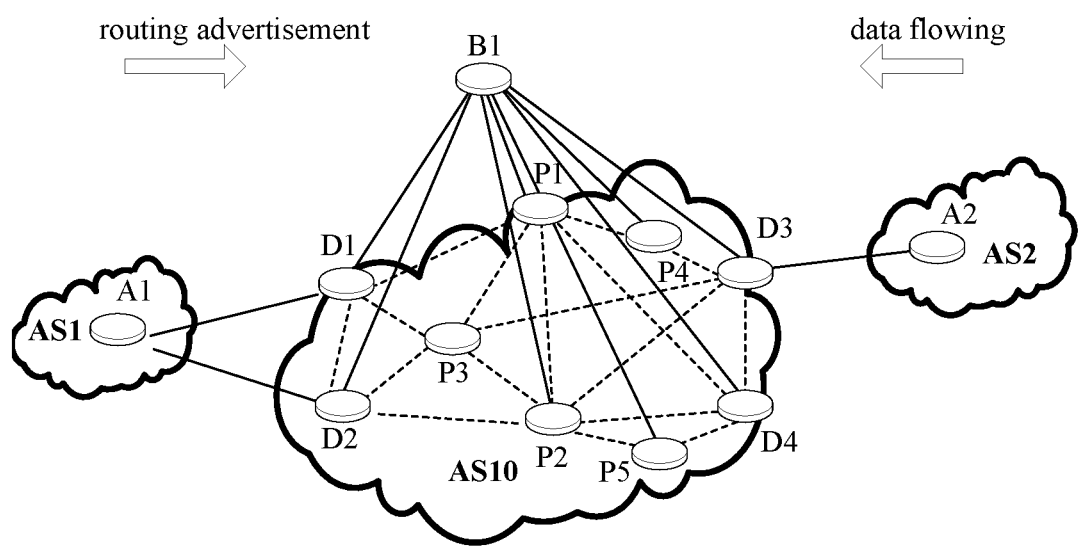
FIG. 2 is a first structure diagram of communication of a first network and a second network in an embodiment of the present disclosure.

For example, referring to FIG. 2, a metropolitan area network AS1 performs routing advertisement to a metropolitan area network AS2, a routing controller B1 obtains all routing nodes through which data need to pass when flowing from AS2 to AS1 according to routing advertisement information of AS1, where AS1 and AS2 are connected through a backbone network AS10, and all the routing nodes include routing nodes D1, D2, D3 and D4, routing nodes P1, P2, P3, P4 and P5, a routing node A1 of AS1 and a routing node A2 of AS2.

After all the routing nodes through which the data need to pass when flowing from AS2 to AS1 are obtained, the data may be transmitted from AS2 to AS1 through multiple paths, for example, the multiple paths may be A2→D3→P4→P1→D1→A1, A2→D3→P3→D1→A1, A2→D3→P3→D2→A1, A2→D3→P4→P1→P3→D1→A1, A2→D3→P4→P1→P3→D2→A1, A2→D3→P2→P3→D1→A1, A2→D3→P2→P3→D2→A1, and the like. A path may be randomly selected from the multiple paths as a path of the data flowing from AS2 to AS1. Assuming that a path randomly selected from the multiple paths is A2→D3→P3→D1→A1, and then all routing nodes included in the path through which the data pass when flowing from AS2 to AS1 are determined as A2, D3, P3, D1 and A1.

In a specific implementation process, all the routing nodes included in the path through which the data pass when flowing from the second network to the first network may also be determined according to the routing advertisement information and received routing plan information between the first network and the second network, where plan nodes in the routing plan information include N routing node between the first network and the second network, and the determined routing nodes include the N routing node, and N is a positive integer.

The routing plan information may be obtained before the first network performs the routing advertisement to the second network, may also be obtained in a process of performing the routing advertisement and may also be obtained after performing the routing advertisement, which is not specifically limited in the present application.

Specifically, the N routing node refer to nodes through which the data must pass when flowing from the second network to the first network, a value of N may be 1, 2, 5, 10, 30, or the like, the N routing node may be a part or all of the routing nodes through which the data pass when flowing from the second network to the first network, and when the N routing node is a part of the routing nodes through which the data pass when flowing from the second network to the first network, a routing node through which the data pass when flowing from the second network to the first network and conforming to a preset constraint condition may be determined according to the routing advertisement information and the received routing plan information between the first network and the second network.

Certainly, when the N routing node is a part of the routing nodes through which the data pass when flowing from the second network to the first network, some other nodes may also be randomly selected from routing nodes between the first network and the second network, for enabling the data to flow from the second network to the first network through the other nodes and the N routing node.

It is taken as an example below that the N routing node is all of the routing nodes through which the data pass when flowing from the second network to the first network.

For example, referring to FIG. 2, the metropolitan area network AS1 performs routing advertisement to the metropolitan area network AS2, the routing controller B1 obtains all the routing nodes through which the data need to pass when flowing from AS2 to AS1 according to the routing advertisement information of AS1, where AS1 and AS2 are connected through the backbone network AS10, and all the routing nodes include the routing nodes D1, D2, D3 and D4, the routing nodes P1, P2, P3, P4 and P5, the routing node A1 of AS1 and the routing node A2 of AS2.

When plan nodes of the routing plan information of the data flowing from AS2 to AS1 received by the routing controller B1 are D3→P4→P1→D1, the routing controller B1 has two routing table entries destining for DEST_IP:

Dest: NextHop:

DEST_IP D1

DEST_IP D2

The routing controller B1 executes requirements of the plan nodes, detects that it has a route satisfying that an egress is D1, and then translates a path into a route of each node on the path.

The following route is sent to D1:
Dest: NextHop:
DEST_IP A1.
The following route is sent to P1:
Dest: NextHop:
DEST_IP D1.
The following route is sent to P4:
Dest: NextHop:
DEST_IP P1.
The following route is selected for D3:
Dest: NextHop:
DEST_IP P4.

Thereby the data from AS2 to AS1 will arrive at AS1 along a path A2→D3→P4→P1→D1→A1, accordingly, the path of the data flowing from AS2 to AS1 conforms to the routing plan information. However, in the prior art, when data flow from AS2 to AS1, a next hop routing node of each selected routing node is selected according to a calculation result of IGP, accordingly, a path of the data flowing from AS2 to AS1 in the prior art does not conform to the routing plan information. By adopting the above technical solution of the present application, the path of the data flowing from AS2 to AS1 conforms to the routing plan information, unused routing nodes may be applied to the routing plan information, thus making full use of routing nodes to transmit data is achieved.

It is taken as an example below that the N routing node is a part of the routing nodes through which the data pass when flowing from the second network to the first network.

Referring to FIG. 2, when a plan node of routing plan information of the data flowing from AS2 to AS1 received by the routing controller B1 only includes P3, paths may be selected by the routing controller B1 are:
A2→D3→P3→D1→A1, A2→D3→P3→D2→A1,
A2→D3→P4→P1→P3→D1→A1,
A2→D3→P4→P1→P3→D2→A1.

Specifically, when the N routing node is a part of the routing nodes through which the data pass when flowing from the second network to the first network, the determining all the routing nodes included in the path through which the data pass when flowing from the second network to the first network according to the routing advertisement information and the received routing plan information between the first network and the second network specifically includes: determining a routing node through which the data pass when flowing from the second network to the first network and conforming to a preset constraint condition according to the routing advertisement information and the received routing plan information between the first network and the second network.

Certainly, when the N routing node is all of the routing nodes through which the data pass when flowing from the second network to the first network, a route may also be determined according to the above-mentioned manner.

The preset constraint condition may be a condition constraining one or more of a bandwidth, a routing cost, a reliability, a time delay, a load and the like. For example, the preset constraint condition may be that the bandwidth is not less than 10M and the routing cost is the lowest, and may also only be that the bandwidth is not less than 20M or the routing cost is the lowest.

Specifically, the determining the routing nodes through which the data pass when flowing from the second network to the first network and conforming to the preset constraint condition according to the routing advertisement information and the received routing plan information between the first network and the second network specifically includes the following steps.

Figure 3:
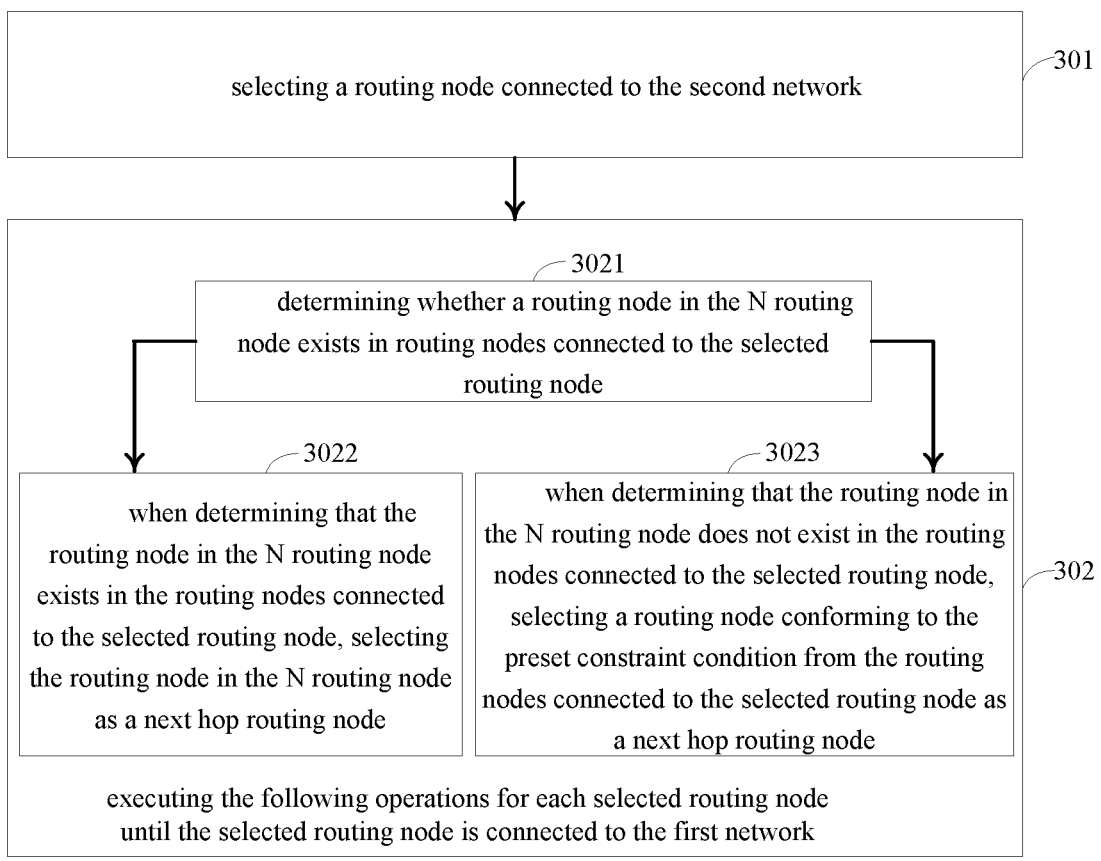
FIG. 3 is a second flowchart of a method for controlling a network traffic path in an embodiment of the present disclosure.

Referring to FIG. 3, the above-mentioned steps include:
step 301: selecting a routing node connected to the second network;
step 302: executing the following operations for each selected routing node until the selected routing node is connected to the first network,
where step 302 includes step 3021, step 3022 and step 3023, which are specifically as follows:
step 3021: determining whether a routing node in the N routing node exists in routing nodes connected to the selected routing node;
when determining that the routing node in the N routing node exists in the routing nodes connected to the selected routing node, step 3022 is executed to select the routing node in the N routing node as a next hop routing node;
when determining that the routing node in the N routing node does not exist in the routing nodes connected to the selected routing node, step 3023 is executed to select a routing node conforming to the preset constraint condition from the routing nodes connected to the selected routing node as a next hop routing node.

In step 301, the routing node connected to the second network is selected.

For example, referring to FIG. 2, when the plan node of the routing plan information of the data flowing from AS2 to AS1 received by the routing controller B1 only includes P3, the routing node connected to AS2 is D3, therefore the routing node connected to AS2 may be determined as D3.

Then, step 302 is executed, since the routing node connected to AS2 is D3, such parameters as a bandwidth parameter from the routing node A2 of AS2 to D3 and the like satisfy the preset constraint condition, and it is taken as an example that the preset constraint condition is that the routing cost is the lowest.

With respect to the selected routing node D3, step 3021 is executed to determine whether a routing node in the N routing node exists in the routing nodes connected to the selected routing node.

Referring to FIG. 2, when selecting routing nodes connected to D3, according to a routing table entry in the routing controller B1, it may be obtained that the routing nodes connected to D3 include P2, P3, P4 and D4, thus whether P2, P3, P4 and D4 include a routing node in the N routing node is determined, since the N routing node is P3, and P2, P3, P4 and D4 include P3, so step 3022 is executed to determine P3 as a next hop routing node of D3.

Then, with respect to P3, step 3021 is executed to determine whether a routing node in the N routing node exists in the routing nodes connected to the selected routing node.

Referring to FIG. 2, when selecting a next hop routing node of P3, according to a routing table entry in the routing controller B1, it may be obtained that routing nodes connected to P3 include P1, D1, D2 and P2, since the N routing node is P3, it may be determined that the P1, D1, D2 and P2 do not include a routing node in the N routing node, and then step 3023 is executed to select a routing node conforming to the preset constraint condition from the routing nodes connected to the selected routing node as the next hop routing node.

Further, referring to FIG. 2, with respect to P3, according to a routing topology structure, since the data need to flow from AS2 to AS1, P1 and P2 may be removed from the routing nodes P1, D1, D2 and P2 connected to P3, and the next hop routing node is selected from D1 and D2. Assuming the bandwidth from P3 to D1 is 100M, then a routing cost from P3 to D1 is: cost=10^8/100M=1, while when a bandwidth from P3 to D2 is 16M, a routing cost from P3 to D2 is: cost=10^8/16M=6, as the routing cost from P3 to D1 is less than the routing cost from P3 to D2, and the preset constraint condition is that the routing cost is the lowest, therefore it may be determined that D1 is the next hop routing node of P3.

With respect to D1, since D1 is connected to the routing node A1 of AS1, the path of the data flowing from AS2 to AS1 may be determined as A2→D3→P3→D1→A1.

Specifically, when determining all the routing nodes included in the path through which the data pass when flowing from the second network to the first network according to the routing advertisement information, and when the routing plan information is not received, the routing node through which the data pass when flowing from the second network to the first network and conforming to the preset constraint condition may be determined according to the routing advertisement information.

Specifically, determining the routing node through which the data pass when flowing from the second network to the first network and conforming to the preset constraint condition according to the routing advertisement information specifically includes the following steps.

Figure 4:
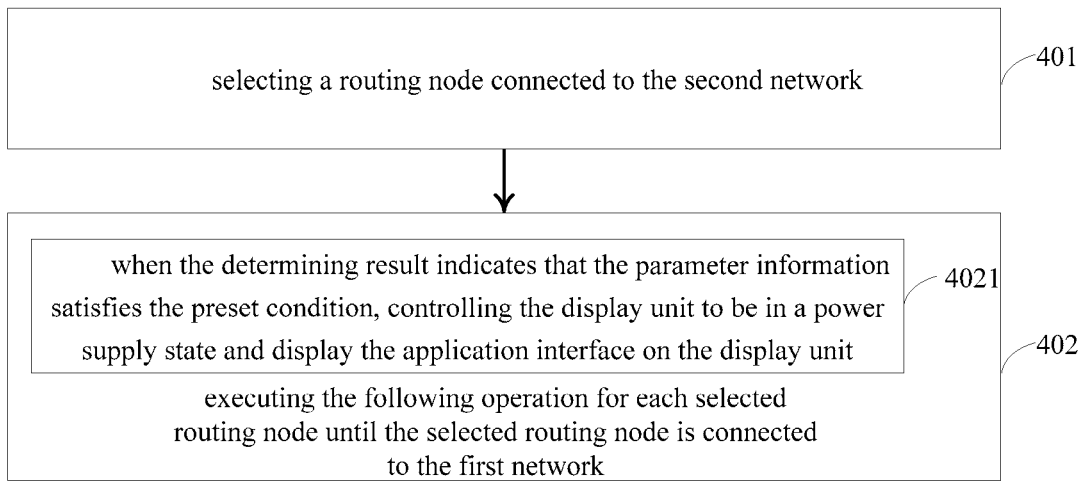
FIG. 4 is a third flowchart of a method for controlling a network traffic path in an embodiment of the present disclosure.

Referring to FIG. 4, the above-mentioned steps include:

step 401: selecting a routing node connected to the second network;

step 402: executing the following operation for each selected routing node until the selected routing node is connected to the first network, where step 402 includes step 4021, which is specifically as follows:

step 4021: selecting a routing node conforming to the preset constraint condition from routing nodes connected to the selected routing node as a next hop routing node.

In step 401, the routing node connected to the second network is selected.

For example, referring to FIG. 2, when the plan node of the routing plan information of the data flowing from AS2 to AS1 received by the routing controller B1 only includes P3, since the routing node connected to AS2 is D3, the routing node connected to AS2 may be determined as D3.

Then, step 302 is executed, since the routing node connected to AS2 is D3, such parameters as a bandwidth parameter from the routing node A2 of AS2 to D3 and the like satisfy the preset constraint condition, and it is taken as an example that the preset constraint condition is that the routing cost is the lowest.

With respect to the selected routing node D3, step 4021 is executed to select a routing node conforming to the preset constraint condition from the routing nodes connected to the selected routing node as the next hop routing node.

Specifically, when a plurality of routing nodes in the routing nodes connected to the selected routing node satisfy the preset constraint condition, a routing node is selected from the plurality of routing nodes as the next hop routing node. For example, the preset constraint condition is that the bandwidth is not less than 10M and the reliability is not less than 80%, referring to FIG. 2, taking D3 as an example, routing nodes connected to D3 include P2, P3, P4 and D4, when P2 and P3 satisfy the preset constraint condition, a routing node may be randomly selected from P2 and P3 as a next hop routing node of D3, and a routing node may also be selected from P2 and P3 according to a routing algorithm, where a path between the routing node and D3 is an optimal path.

Referring to FIG. 2, when selecting routing nodes connected to D3, according to a routing table entry in the routing controller B1, it may be obtained that the routing nodes connected to D3 include P2, P3, P4 and D4, a routing node conforming to the preset constraint condition is selected from P1, D1, D2 and P2 as a next hop routing node. When the preset constraint condition is that the routing cost is the lowest, assuming that a bandwidth from D3 to P2 is 10M, then a routing cost from P3 to D1 is: cost=10^8/10M=10, when a bandwidth from D3 to P3 is 100M, a routing cost from D3 to D3 is 1, when a bandwidth from D3 to P4 is 50M, a routing cost from D3 to D1 is 2, when a bandwidth from D3 to D4 is 20M, a routing cost from D3 to D1 is 5, since 1<2<5<10, it may be determined that the bandwidth from D3 to P3 is the lowest, and then the next hop routing node of D3 is determined as P3.

Referring to FIG. 2, when selecting a next hop routing node of P3, according to a routing table entry in the routing controller B1, it may be obtained that routing nodes connected to P3 include P1, D1, D2 and P2, and a routing node conforming to the preset constraint condition is selected from P1, D1, D2 and P2 as the next hop routing node.

Further, with respect to P3, according to the routing topology structure, since the data need to flow from AS2 to AS1, P1 and P2 may be removed from the routing nodes P1, D1, D2 and P2 connected to P3, and the next hop routing node is selected from D1 and D2. Assuming that a bandwidth from P3 to D1 is 100M, then a routing cost from P3 to D1 is: cost=10^8/100M=1, while when a bandwidth from P3 to D2 is 16M, a routing cost from P3 to D2 is: cost=10^8/16M=6, as the routing cost from P3 to D1 is less than the routing cost from P3 to D2, and the preset constraint condition is that the routing cost is the lowest, therefore it may be determined that D1 is the next hop routing node of P3.

With respect to D1, since D1 is connected to the routing node A1 of AS1, and the data flow from AS2 to AS1, resulting in that A1 is a destination node, then a next hop routing node of D1 may be determined as A1, and a path of the data flowing from AS2 to AS1 is A2→D3→P3→D1→A1. By means of the above-mentioned manner, since each determined routing satisfies the preset constraint condition, the path of the data flowing from AS2 to AS1 may conform to the preset constraint condition, moreover, a routing cost of the determined routing may be the lowest, and the data may be transmitted more stably and quickly.

In a specific implementation process, when a selected routing node exists in all the routing nodes, selecting a next hop routing node from all the routing nodes specifically includes: selecting the next hop routing node from all the routing nodes with the selected routing node removed.

Specifically, when a routing node has been selected, the next hop routing node is selected from all the routing nodes with the selected routing node removed. Referring to FIG. 2, taking D3 as an example, routing nodes connected to D3 include P2, P3, P4 and D4, when P3 has been selected, then a next hop routing node of D3 is selected from P2, P4 and D4, accordingly each traffic path is free of a crossing condition, so that a condition that a plurality of traffic paths are forked after generating an aggregation point may be avoided, and a technical effect of no aggregation point of the plurality of traffic paths is achieved.

Figure 5:
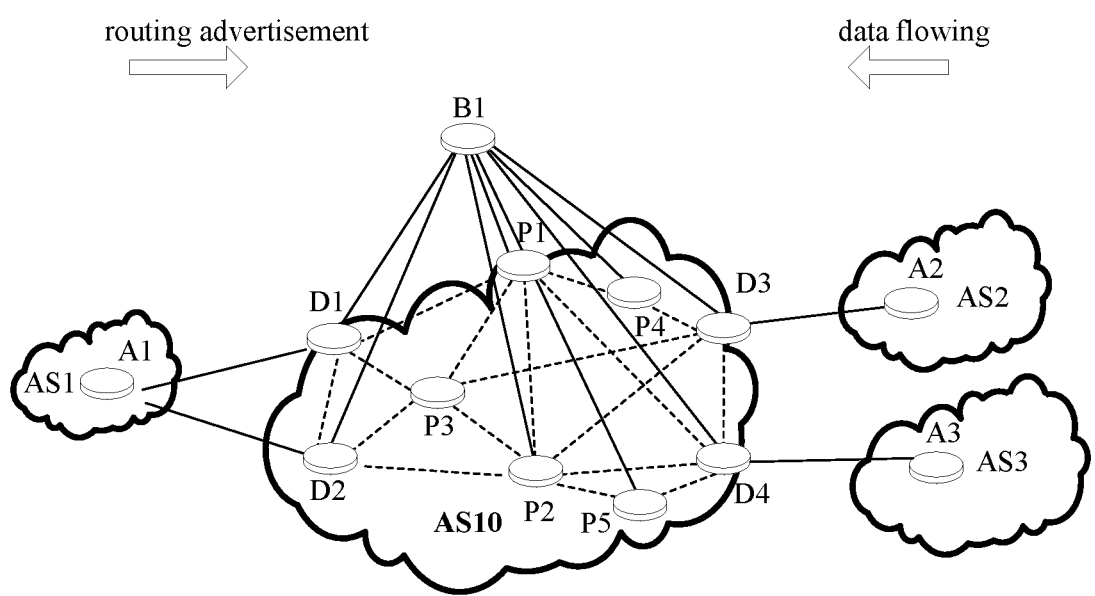
FIG. 5 is a second structure diagram of communication between a first network and a second network in an embodiment of the present disclosure.

For example, referring to FIG. 5, when AS1 performs routing advertisement to AS2 and a metropolitan area network AS3, the following step is executed at first: respectively selecting a routing node D3 connected to AS2 and a routing node D4 connected to AS3, where both D3 and D4 conform to a preset constraint condition, and it is taken as an example that the preset constraint condition is that the routing cost is the lowest.

Then, with respect to D3, routing nodes connected to D3 are P4, P3, P2 and D4, since D4 has been selected, a routing node having the lowest cost with D3 is selected from P4, P3 and P2, if a cost between P4 and D3 is 5, a cost between P3 and D3 is 3, and a cost between P3 and D3 is 10, since 3<5<10, P3 is selected as a next hop routing node of D3.

Then, with respect to D4, routing nodes connected to D4 are D3, P1, P2 and P5, since D3 has been selected, a routing node having the lowest cost with D4 is selected from P1, P2 and P5, if a cost between P1 and D4 is 6, a cost between P2 and D4 is 4, and a cost between P5 and D4 is 9, since 4<6<9, P2 is selected as a next hop routing node of D4.

Then, with respect to P3, routing nodes connected to P3 are P1, D1, D2, D3 and P2, since P2 and D3 have been selected, a routing node having the lowest cost with P3 is selected from P1, D1 and D2, if a cost between P1 and P3 is 20, a cost between D1 and P3 is 7, and a cost between D2 and P3 is 15, since 7<15<20, D1 is selected as a next hop routing node of P3.

Then, with respect to P2, routing nodes connected to P2 are D3, P1, P3, D2, P5 and D4, since D4, D3 and P3 have been selected, a routing node having the lowest cost with P2 is selected from P1, D2 and P5, if a cost between P1 and P2 is 13, a cost between D1 and P2 is 1, and a cost between D2 and P2 is 35, since 1<13<35, D2 is selected as a next hop routing node of P2.

Then, with respect to D1, since D1 is connected to the routing node A1 of AS1, and data flow from AS2 to AS1, resulting in that A1 is a destination node, then a next hop routing node of D1 may be determined as A1, and a path of the data flowing from AS2 to AS1 is A2→D3→P3→D1→A1.

Then, with respect to D2, since D2 is connected to the routing node A1 of AS1, and data flow from AS3 to AS1, resulting in that A1 is a destination node, then a next hop routing node of D1 may be determined as A1, and a path of the data flowing from AS3 to AS1 is A3→D4→P2→D2→A1, so that two obtained traffic paths have no aggregation point, and a technical effect of no aggregation point of a plurality of traffic paths is achieved.

Then, step 103 is executed, in the step, the next hop routing node is configured for each determined routing node, where the next hop routing node is a node in all the routing nodes included in the path and is adjacent to the routing node for which the next hop routing node is configured, and the routing node for which the next hop routing node is configured does not include the routing node of the first network or the routing node of the second network.

In a specific implementation process, the routing node of the first network is a destination node and the routing node of the second network is a starting node, resulting in that all the routing nodes included in the determined path absolutely include the routing node of the first network and the routing node of the second network, and that the routing node of the first network has no next hop routing node, in addition, an executive body of the method for controlling a network traffic path cannot control the routing node of the second network in general, therefore after determining all the routing nodes included in the path through which the data pass when flowing from the second network to the first network, the routing node of the first network and the routing node of the second network need to be removed, and then the next hop routing node is configured for each determined routing node, so that when the data arrive at each determined routing node, each determined routing node automatically transmits the data to the next hop routing node, so as to improve a data forwarding efficiency.

Specifically, the next hop routing node is a node in all the routing nodes included in the path and is adjacent to the routing node for which the next hop routing node is configured, namely, representing that the next hop routing node and the routing node for which the next hop routing node is configured are mutual neighbor nodes, the neighbor nodes means nodes in which a routing node is directly connected to another routing node, and when a routing node and another routing node are mutual neighbor nodes, it may be determined that the routing node and another routing node are adjacent nodes.

For example, referring to FIG. 5, with respect to D3, routing nodes directly connected to D3 are P4, P3, P2 and D4, then it may be determined that D3 and P4 are mutual neighbor nodes, D3 and P3 are also mutual neighbor nodes, D3 and P2 are also mutual neighbor nodes, and D3 and D4 are also mutual neighbor nodes.

As another example, referring to FIG. 5, with respect to P3, routing nodes directly connected to P3 are P1, D1, D2, D3 and P2, then it may be determined that P3 and P1 are mutual neighbor nodes, P3 and D1 are also mutual neighbor nodes, P3 and D2 are also mutual neighbor nodes, P3 and D3 are also mutual neighbor nodes, P3 and P2 are also mutual neighbor nodes. However, P3, P4 and P5 are not directly connected, resulting in that P3 and P4 are not neighbor nodes, namely, representing that P3 and P4 are not adjacent nodes, and that P3 and P5 are not neighbor nodes, namely, representing that P3 and P5 are not adjacent nodes.

For example, referring to FIG. 5, when determining a path of data flowing from AS2 to AS1 as A2→D3→P3→D1→A1, a routing controller B1 sends the following route to D3:
Dest: NextHop:
DEST_IP P3,
sends the following route to P3:
Dest: NextHop:
DEST_IP D1,
and sends the following route to D1:
Dest: NextHop:
DEST_IP A1.

In this way, when the data are transmitted from AS2 to AS1, the routing controller B1 has configured a next hop route for D3 as P3, resulting in that D3 will directly transmit the data to P3, when P3 receives the data, since the routing controller B1 has configured a next hop route for P3 as D1, P3 will directly transmit the data to D1, and then D1 directly transmits the data to AS1. As a result, a technical effect of selecting a next hop routing node of a routing node as an adjacent node neighbor by neighbor is achieved, and since the adjacent node may be selected as the next hop routing node of the routing node neighbor by neighbor, when a network traffic in a routing node is heavier, the routing node may be excluded from the determined routing nodes, and thus fine and flexible traffic dispersion may be achieved.

Moreover, when determining a path of data flowing from AS3 to AS1 as A3→D4→P2→D2→A1, the routing controller B1 sends the following route to D4:
Dest: NextHop:
DEST_IP P2,
sends the following route to P3:
Dest: NextHop:
DEST_IP D2,
and sends the following route to D2:
Dest: NextHop:
DEST_IP A1.

In this way, when the data are transmitted from AS3 to D3, the routing controller B1 has configured a next hop route for D4 as P2, resulting in that D4 will directly transmit the data to P2, when P2 receives the data, since the routing controller B1 has already configured a next hop route for P2 as D2, P2 will directly transmit the data to D2, and then D2 directly transmits the data to AS1. As a result, a technical effect of selecting a next hop routing node of a routing node as an adjacent node neighbor by neighbor is achieved, and since the adjacent node may be selected as the next hop routing node of the routing node neighbor by neighbor, when a network traffic in a routing node is heavier, the routing node may be excluded from the determined routing nodes, and thus fine and flexible traffic dispersion may be achieved.

In another embodiment, before the determining all the routing nodes included in the path through which the data pass when flowing from the second network to the first network according to the routing advertisement information and the received routing plan information between the first network and the second network, the following operation is executed for each routing node in the N routing node: detecting whether each routing node in the N routing node has been selected.

In a specific implementation process, when each routing node in the N routing node is not selected, all the routing nodes included in the path through which the data pass when flowing from the second network to the first network are determined; and otherwise, prompt information is sent to prompt that the routing plan information is incorrect.

For example, referring to FIG. 5, at a TI moment, plan nodes in routing plan information of data flowing from AS2 to AS1 are D3→P3→D1, and a routing path through which data pass when flowing from AS3 to AS1 is A3→D4→P2→P3→D2→A1, whether each routing node in D3, P3 and D1 has been selected is detected, since P3 has been selected, voice data "the routing plan information is incorrect" are sent to a user, to prompt that the routing plan information is incorrect, and information that P3 has been selected may also be sent to a client, so as to reset the routing plan information; and if the routing path through which the data pass when flowing from AS3 to AS1 is A3→D4→P2→D2→A1, since each routing node in D3, P3 and D1 is not selected, routing nodes through which the data pass when flowing from AS2 to AS1 may be determined as A2→D3→P3→D1→A1.

In this way, the plan nodes included in the routing plan information may be checked, accordingly each traffic path is free of a crossing condition, so that a condition that a plurality of traffic paths are forked after generating an aggregation point may be avoided, and a technical effect of no aggregation point of the plurality of traffic paths is achieved.

In the embodiment of the present disclosure, the technical solution of the present application includes: receiving the routing advertisement information from the first network to the second network, determining all the routing nodes included in the path through which the data pass when flowing from the second network to the first network according to the routing advertisement information, and configuring the next hop routing node for each determined routing node. Since the next hop routing node is configured for each determined routing node in the technical solution of the present application, when the data arrive at each determined routing node, the data will be automatically transmitted to the next hop routing node, and thus the technical problem in the prior art that the adjacent node cannot be selected as the next hop routing node of the routing node neighbor by neighbor is solved.

Embodiment 2

Figure 6:
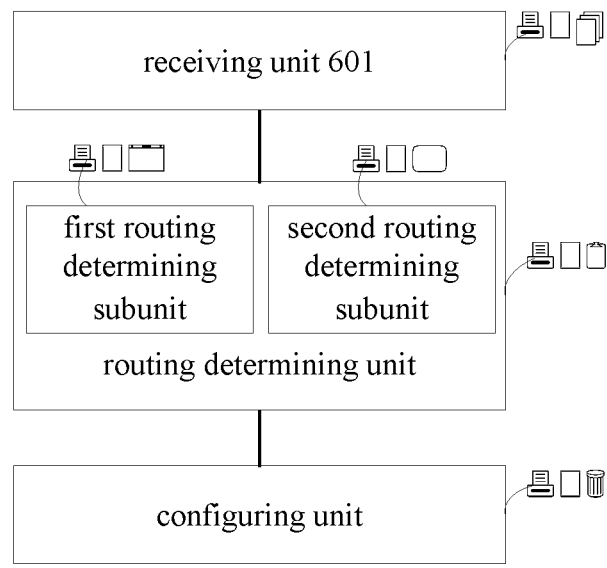
FIG. 6 is a first structure diagram of an apparatus for controlling a network traffic path in an embodiment of the present disclosure.

The embodiment of the present disclosure provides an apparatus for controlling a network traffic path. Referring to FIG. 6, the apparatus includes: a receiving unit 601, configured to receive routing advertisement information from a first network to a second network; a routing determining unit 602, configured to receive the routing advertisement information sent by the receiving unit 601, and determine all routing nodes included in a path through which data pass when flowing from the second network to the first network according to the routing advertisement information; and a configuring unit 603, configured to receive all the determined routing nodes sent by the routing determining unit 602, and configure a next hop routing node for each determined routing node, where the next hop routing node is a node in all the routing nodes included in the path and is adjacent to the routing node for which the next hop routing node is configured, and the routing node for which the next hop routing node is configured does not include a routing node of the first network or a routing node of the second network.

Since the data flow from the second network to the first network, all the determined routing nodes absolutely include the routing node of the first network and the routing node of the second network, and the routing node of the first network may be determined as a destination node.

Specifically, after receiving the routing advertisement information, the receiving unit 601 may obtain all the routing nodes through which data pass when flowing from the second network to the first network according to the routing advertisement information and select a path from all the routing nodes, so that the data may be transmitted from the second network to the first network through the path.

Preferably, the routing determining unit 602 includes a first routing determining subunit 604, configured to determine all the routing nodes included in the path through which the data pass when flowing from the second network to the first network according to the routing advertisement information and received routing plan information between the first network and the second network, where plan nodes in the routing plan information include N routing node between the first network and the second network, and the determined routing nodes include the N routing node, and N is a positive integer.

The routing plan information may be obtained before the first network performs routing advertisement to the second network, may also be obtained in a process of performing the routing advertisement and may also be obtained after performing the routing advertisement, which is not specifically limited in the present application.

Specifically, the N routing node refer to nodes through which the data must pass when flowing from the second network to the first network, a value of N may be 1, 2, 5, 10, 30, or the like, the N routing node may be a part or all of the routing nodes through which the data pass when flowing from the second network to the first network.

Preferably, when the N routing node is a part of the routing nodes through which the data pass when flowing from the second network to the first network, when the N routing node is a part of the routing nodes through which the data pass when flowing from the second network to the first network, the first routing determining subunit 604 is configured to determine a routing node through which the data pass when flowing from the second network to the first network and conforming to a preset constraint condition according to the routing advertisement information and the received routing plan information between the first network and the second network.

Certainly, when the N routing node is a part of the routing nodes through which the data pass when flowing from the second network to the first network, some other nodes may also be randomly selected from routing nodes between the first network and the second network, for enabling the data to flow from the second network to the first network through the other nodes and the N routing node.

Preferably, the first routing determining subunit 604 is specifically configured to select a routing node connected to the second network, execute the following operations for each selected routing node until the selected routing node is connected to the first network, determine whether a routing node in the N routing node exists in routing nodes connected to the selected routing node, when determining that the routing node in the N routing node exists in the routing nodes connected to the selected routing node, select the routing node in the N routing node as a next hop routing node, when determining that a routing node in the N routing node does not exist in the routing nodes connected to the selected routing node, select a routing node conforming to the preset constraint condition from the routing nodes connected to the selected routing node as a next hop routing node.

The preset constraint condition may be a condition constraining one or more of a bandwidth, a routing cost, a reliability, a time delay, a load and the like. For example, the preset constraint condition may be that the bandwidth is not less than 10M and the routing cost is the lowest, and may also only be that the bandwidth is not less than 20M or the routing cost is the lowest.

For example, referring to FIG. 2, when routing plan information of data flowing from AS2 to AS1 received by a routing controller B1 only includes P3, since a routing node connected to AS2 only includes D3, therefore the routing node connected to AS2 may be determined as D3, taking it as an example that the preset constraint condition is that the routing cost is the lowest, with respect to the selected routing node D3, when selecting routing nodes connected to D3, according to a routing table entry in the routing controller B1, it may be obtained that the routing nodes connected to D3 include P2, P3, P4 and D4, thus whether P2, P3, P4 and D4 include a routing node in the N routing node is determined, since the N routing node is P3, and P2, P3, P4 and D4 include P3, so P3 is determined as a next hop routing node of D3.

When selecting a next hop routing node of P3, according to a routing table entry in the routing controller B1, it may be obtained that routing nodes connected to P3 include P1, D1, D2 and P2, since the N routing node is P3, it may be determined that the P1, D1, D2 and P2 do not include a routing node in the N routing node, and then a routing node conforming to the preset constraint condition is selected from the routing nodes connected to the selected routing node as the next hop routing node. Moreover, since the data need to flow from AS2 to AS1, P1 and P2 may be removed from the routing nodes P1, D1, D2 and P2 connected to P3, and the next hop routing node is selected from D1 and D2. Assuming that a bandwidth from P3 to D1 is 100M, then a routing cost from P3 to D1 is: cost=10^8/100M=1, while when a bandwidth from P3 to D2 is 16M, a routing cost from P3 to D2 is: cost=10^8/16M=6, as the routing cost from P3 to D1 is less than the routing cost from P3 to D2, and the preset constraint condition is that the routing cost is the lowest, therefore it may be determined that D1 is the next hop routing node of P3.

With respect to D1, since D1 is connected to the routing node A1 of AS1, the path of the data flowing from AS2 to AS1 may be determined as A2→D3→P3→D1→A1.

The routing determining unit 602 includes a second routing determining subunit 605, configured to determine a routing node through which the data pass when flowing from the second network to the first network and conforming to a preset constraint condition according to the routing advertisement information.

Preferably, the second routing determining subunit 605 is specifically configured to select a routing node connected to the second network, execute the following operation for each selected routing node until the selected routing node is connected to the first network, select a routing node conforming to the preset constraint condition from routing nodes connected to the selected routing node as a next hop routing node.

Specifically, when a plurality of routing nodes in the routing nodes connected to the selected routing node satisfy the preset constraint condition, a routing node is selected from the plurality of routing nodes as the next hop routing node. For example, the preset constraint condition is that the bandwidth is not less than 10M and the reliability is not less than 80%, referring to FIG. 2, taking D3 as an example, routing nodes connected to D3 include P2, P3, P4 and D4, when P2 and P3 satisfy the preset constraint condition, a routing node may be randomly selected from P2 and P3 as a next hop routing node of D3, and a routing node may also be selected from P2 and P3 according to a routing algorithm, where a path between the routing node and D3 is an optimal path.

Preferably, the configuring unit 603 is further configured to, when data of a plurality of the second networks need to be transmitted to the first network, for the second network, select a routing node conforming to the preset constraint condition from all unselected routing nodes connected to the selected routing node as the next hop routing node.

Specifically, when a routing node has been selected, a next hop routing node is selected from all the routing nodes with the selected routing node removed. Referring to FIG. 2, taking D3 as an example, routing nodes connected to D3 include P2, P3, P4 and D4, when P3 has been selected, then a next hop routing node of D3 is selected from P2, P4 and D4, accordingly each traffic path is free of a crossing condition, so that a condition that a plurality of traffic paths are forked after generating an aggregation point may be avoided, and a technical effect of no aggregation point of the plurality of traffic paths is achieved.

In the embodiment of the present disclosure, the technical solution of the present application includes: receiving the routing advertisement information from the first network to the second network, determining all the routing nodes included in the path through which the data pass when flowing from the second network to the first network according to the routing advertisement information, and configuring the next hop routing node for each determined routing node. Since the next hop routing node is configured for each determined routing node in the technical solution of the present application, when the data arrive at each determined routing node, the data will be automatically transmitted to the next hop routing node, and thus the technical problem in the prior art that the adjacent node cannot be selected as the next hop routing node of the routing node neighbor by neighbor is solved.

Embodiment 3

Figure 7:
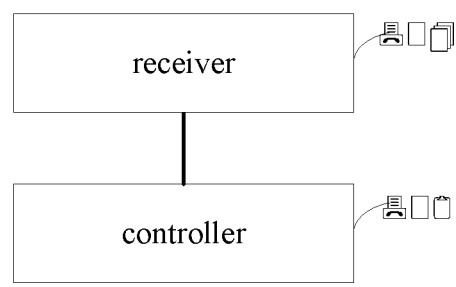
FIG. 7 is a second structure diagram of an apparatus for controlling a network traffic path in an embodiment of the present disclosure.

The second embodiment of the present disclosure provides an apparatus for controlling a network traffic path. Referring to FIG. 7, the apparatus includes: a receiver 701, configured to receive routing advertisement information from a first network to a second network; and a controller 702, configured to determine all routing nodes included in a path through which data pass when flowing from the second network to the first network according to the routing advertisement information, and configure a next hop routing node for each determined routing node, where the next hop routing node is a node in all the routing nodes included in the path and is adjacent to the routing node for which the next hop routing node is configured, and the routing node for which the next hop routing node is configured does not include a routing node of the first network or a routing node of the second network.

For example, the receiver 701 may be an electronic device such as a WIFI module, an antenna, or the like, and further, the controller 702 may be a single processing chip and may also be integrated in a processor of the apparatus.

Since the data flow from the second network to the first network, all the determined routing nodes absolutely include the routing node of the first network and the routing node of the second network, and the routing node of the first network may be determined as a destination node.

Specifically, after the receiver 701 receives the routing advertisement information, the apparatus may obtain all the routing nodes through which data pass when flowing from the second network to the first network according to the routing advertisement information and select a path from all the routing nodes, so that the data may be transmitted from the second network to the first network through the path.

Preferably, the controller 702 is specifically configured to determine all the routing nodes included in the path through which the data pass when flowing from the second network to the first network according to the routing advertisement information and received routing plan information between the first network and the second network, where plan nodes in the routing plan information include N routing node between the first network and the second network, and the determined routing nodes include the N routing node, and N is a positive integer.

The routing plan information may be obtained before the first network performs routing advertisement to the second network, may also be obtained in a process of performing the routing advertisement and may also be obtained after performing the routing advertisement, which is not specifically limited in the present application.

Specifically, the N routing node refer to nodes through which the data must pass when flowing from the second network to the first network, a value of N may be 1, 2, 5, 10, 30, or the like, the N routing node may be a part or all of the routing nodes in the routing nodes through which the data pass when flowing from the second network to the first network.

Preferably, when the N routing node is a part of the routing nodes through which the data pass when flowing from the second network to the first network, when the N routing node is a part of the routing nodes in the routing nodes through which the data pass when flowing from the second network to the first network, the controller 702 is specifically configured to determine a routing node through which the data pass when flowing from the second network to the first network and conforming to a preset constraint condition according to the routing advertisement information and the received routing plan information between the first network and the second network.

Certainly, when the N routing node is a part of the routing nodes through which the data pass when flowing from the second network to the first network, some other nodes may also be randomly selected from routing nodes between the first network and the second network, for enabling the data to flow from the second network to the first network through the other nodes and the N routing node.

Preferably, the controller 702 is specifically configured to select a routing node connected to the second network, execute the following operations for each selected routing node until the selected routing node is connected to the first network, determine whether a routing node in the N routing node exists in routing nodes connected to the selected routing node, when determining that the routing node in the N routing node exists in the routing nodes connected to the selected routing node, select the routing node in the N routing node as a next hop routing node, when determining that a routing node in the N routing node does not exist in the routing nodes connected to the selected routing node, select a routing node conforming to the preset constraint condition from the routing nodes connected to the selected routing node as a next hop routing node.

The preset constraint condition may be a condition constraining one or more of a bandwidth, a routing cost, a reliability, a time delay, a load and the like. For example, the preset constraint condition may be that the bandwidth is not less than 10M and the routing cost is the lowest, and may also only be that the bandwidth is not less than 20M or the routing cost is the lowest.

Preferably, the controller 702 is further configured to determine a routing node through which the data pass when flowing from the second network to the first network and conforming to a preset constraint condition according to the routing advertisement information.

Preferably, the controller 702 is specifically configured to select a routing node connected to the second network, execute the following operation for each selected routing node until the selected routing node is connected to the first network, select a routing node conforming to the preset constraint condition from routing nodes connected to the selected routing node as a next hop routing node.

Specifically, when a plurality of routing nodes in the routing nodes connected to the selected routing node satisfy the preset constraint condition, a routing node is selected from the plurality of routing nodes as the next hop routing node. For example, the preset constraint condition is that the bandwidth is not less than 10M and the reliability is not less than 80%, referring to FIG. 2, taking D3 as an example, routing nodes connected to D3 include P2, P3, P4 and D4, when P2 and P3 both satisfy the preset constraint condition, a routing node may be randomly selected from P2 and P3 as a next hop routing node of D3, and a routing node may also be selected from P2 and P3 according to a routing algorithm, where a path between the routing node and D3 is an optimal path.

Preferably, the controller 702 is further configured to, when data of a plurality of the second networks need to be transmitted to the first network, for the second network, select a routing node conforming to the preset constraint condition from all unselected routing nodes connected to the selected routing node as the next hop routing node.

Specifically, when a routing node has been selected, a next hop routing node is selected from all the routing nodes with the selected routing node removed. Referring to FIG. 2, taking D3 as an example, routing nodes connected to D3 include P2, P3, P4 and D4, when P3 has been selected, then a next hop routing node of D3 is selected from P2, P4 and D4, accordingly each traffic path is free of a crossing condition, so that a condition that a plurality of traffic paths are forked after generating an aggregation point may be avoided, and a technical effect of no aggregation point of the plurality of traffic paths is achieved.

In the embodiment of the present disclosure, the technical solution of the present application includes: receiving the routing advertisement information from the first network to the second network, determining all the routing nodes included in the path through which the data pass when flowing from the second network to the first network according to the routing advertisement information, and configuring the next hop routing node for each determined routing node. Since the next hop routing node is configured for each determined routing node in the technical solution of the present application, when the data arrive at each determined routing node, the data will be automatically transmitted to the next hop routing node, and thus the technical problem in the prior art that the adjacent node cannot be selected as the next hop routing node of the routing node neighbor by neighbor is solved.

Those skilled in the art should understand that, the embodiments of the present disclosure may be provided as a method, an apparatus (device) or a computer program product. Therefore, the present disclosure may adopt the forms of complete hardware embodiments, complete software embodiments or combined embodiments of software and hardware. Moreover, the present disclosure may adopt the form of a computer program product implemented on one or multiple computer available storage media (including, but not limited to, a disk storage, a CD-ROM, an optical memory or the like) including computer available program codes.

The present disclosure is described in accordance with the method, the apparatus (device) in the embodiments of the present disclosure and a flowchart and/or a block diagram of the computer program product. It should be understood that, computer program instructions may achieve each flow and/or block in the flowchart and/or the block diagram and the combination of the flows and/or blocks in the flowchart and/or the block diagram. These computer program instructions may be provided to a general-purpose computer, a special-purpose computer, an embedded processor or processors of other programmable data processing devices to generate a machine, such that the instructions executed by the computers or the processors of the other programmable data processing devices generate apparatuses used for achieving appointed functions in one flow or multiple flows of the flowchart and/or one block or multiple blocks of the block diagram.

These computer program instructions may also be stored in a computer readable memory capable of guiding the computers or the other programmable data processing devices to work in particular manners, such that the instructions stored in the computer readable memory generate products including instruction apparatuses, and the instruction apparatuses realize the appointed functions in one flow or multiple flows of the flowchart and/or one block or multiple blocks of the block diagram.

These computer program instructions may also be loaded onto the computers or other programmable data processing devices, to execute a series of operation steps on the computers or other programmable data processing devices to produce processing generated by the computers, such that the instructions executed on the computers or other programmable data processing devices provide steps used for achieving the appointed functions in one flow or multiple flows of the flowchart and/or one block or multiple blocks of the block diagram.

Although the preferred embodiments of the present disclosure have been described, those skilled in the art may make additional variations and modifications to these embodiments once mastering the basic inventive concepts. Therefore, the appended claims are intended to be explained as including the preferred embodiments and all the variations and modifications within the scope of the present disclosure.

Apparently, those skilled in the art may make various variations and modifications to the present disclosure without departing from the spirit and scope of the present disclosure. In this way, if these modifications and variations of the present disclosure belong to the scope of the claims and the equivalent technology thereof of the present disclosure, then the present disclosure is intended to encompass these modifications and variations.

What is claimed is:

1. A method for controlling a network traffic path, the method comprising:
   receiving, by a routing controller, routing advertisement information from a first network to a second network, wherein the routing advertisement information includes information about routing nodes in a third network capable of providing paths connecting the first and second networks;
   determining, by the routing controller, a path between a first border node of the third network and a second border node of the third network according to the routing advertisement information,
      wherein the path comprises the first and second border nodes, and one or more of the routing nodes of the third network that connect the first and second border nodes so as to allow for communication between the first and second border nodes, and
      wherein the first border node communicates with the first network, and the second border node communicates with the second network; and
   configuring, by the routing controller, a next hop routing node for each of the border and routing nodes in the determined path by sending to each of the border and routing nodes in the determined path a route between the node and its associated next hop routing node,
      wherein each of the border and routing nodes in the determined path is adjacent its associated next hop routing node,
      wherein each next hop routing node is a routing node not in the determined path, and
      wherein configuring the next hop routing node for each of the border and routing nodes in the determined path provides each of the border and routing nodes in the determined path with an alternative path connecting the first and second border nodes.

2. The method according to claim 1, wherein determining the path between the first border node of the third network and the second border node of the third network according to the routing advertisement information comprises:
   determining, by the routing controller, the routing nodes in the path according to the routing advertisement information and received routing plan information between the first and second border nodes, wherein plan nodes in the routing plan information comprise at least one routing node between the first and second border nodes, and the determined path comprises the at least one routing node.

3. The method according to claim 1, wherein determining the path between the first border node of the third network and the second border node of the third network comprises:

determining, by the routing controller, a routing node between the first border node and the second border node that conforms to a preset constraint condition according to the routing advertisement information and received routing plan information between the first and second border nodes, wherein plan nodes in the routing plan information comprise at least one routing node between the first and second border nodes, and the determined path comprises the at least one routing node.

4. The method according to claim 3, wherein determining the routing node between the first border node and the second border node that conforms to the preset constraint condition according to the routing advertisement information and the received routing plan information between the first and second border nodes comprises:

selecting, by the routing controller, a routing node communicating with the second border node;

executing, by the routing controller, the following operations for the selected routing node until the selected routing node communicates with the first border node:

determining, by the routing controller, whether routing nodes connected to the selected routing node comprise a routing node in the at least one routing node;

in response to determining that the routing nodes connected to the selected routing node comprise the routing node in the at least one routing node, selecting, by the routing controller, the routing node in the at least one routing node as the next hop routing node; and in response to determining that the routing nodes connected to the selected routing node do not comprise the routing node in the at least one routing node, selecting, by the routing controller, a routing node conforming to the preset constraint condition from the routing nodes connected to the selected routing node communicating with the second border node as the next hop routing node.

5. The method according to claim 4, wherein selecting, by the routing controller, the routing node conforming to the preset constraint condition from the routing nodes connected to the selected routing node communicating with the second border node as the next hop routing node comprises:

when data of a plurality of the second networks need to be transmitted to the first network, for the second network, determining, by the routing controller, the routing node conforming to the preset constraint condition from at least one unselected routing node connected to the selected routing node communicating with the second border node as the next hop routing node.

6. The method according to claim 1, wherein determining the path between the first and second border nodes of the third network according to the routing advertisement information comprises:

determining, by the routing controller, a routing node between the first and second border nodes conforming to a preset constraint condition according to the routing advertisement information.

7. The method according to claim 6, wherein determining the routing node between the first and second border nodes conforming to the preset constraint condition according to the routing advertisement information comprises:

selecting, by the routing controller, a routing node communicating with the second border node;

executing, by the routing controller, the following operation for the selected routing node until the selected routing node communicates with the first border node: and selecting, by the routing controller, a routing node conforming to the preset constraint condition from routing nodes connected to the selected routing node communicating with the second border node as the next hop routing node.

8. The method according to claim 7, wherein selecting, by the routing controller, the routing node conforming to the preset constraint condition from the routing nodes connected to the selected routing node communicating with the second border node as the next hop routing node comprises:

when data of a plurality of the second networks need to be transmitted to the first network, for the second network, determining, by the routing controller, a routing node conforming to the preset constraint condition from at least one unselected routing node connected to the selected routing node communicating with the second border node as the next hop routing node.

9. A routing controller for controlling a network traffic path, the routing controller comprising:

a processor;

a receiver configured to cooperate with the processor to receive routing advertisement information from a first network to a second network, wherein the routing advertisement information includes information about routing nodes in a third network capable of providing paths connecting the first and second networks; and the processor configured to:

determine a path between a first border nodes of the third network and a second border node of the third network according to the routing advertisement information, wherein the path comprises the first and second border nodes and one or more of the routing nodes of the third network that connects the first and second border nodes so as to allow for communication between the first and second border nodes, wherein the first border node communicates with the first network, and the second border node communicates with the second network, and configure a next hop routing node for each of the border and routing nodes in the determined path by sending to each of the border and routing nodes in the determined path a route between the node and its associated next hop routing node, wherein each of the border and routing nodes in the determined path is adjacent its associated next hop routing node, wherein each next hop routing node is a routing node not in the determined path, and wherein configuring the next hop routing node for each of the border and routing nodes in the determined path provides each of the border and routing nodes in the determined path with an alternative path connecting the first and second border nodes.

10. The routing controller according to claim 9, wherein the processor is further configured to determine the routing nodes in the path according to the routing advertisement information and received routing plan information between the first and second border nodes, wherein plan nodes in the routing plan information comprise at least one routing node between the first and second border nodes, and the determined path comprises the at least one routing node.

11. The routing controller according to claim 9, wherein the processor is further configured to determine a routing node between the first and second border nodes conforming to a preset constraint condition according to the routing advertisement information and received routing plan information between the first and second border nodes,
   wherein plan nodes in the routing plan information comprise at least one routing node between the first and second border nodes, and the determined path comprises the at least one routing node.

12. The routing controller according to claim 11, wherein the processor is further configured to
   select a routing node communicating with the second border node;
   execute the following operations for the selected routing node until the selected routing node communicates with the first border node;
   determine whether routing nodes connected to the selected routing node comprise a routing node in the at least one routing node;
   in response to determining that the routing nodes connected to the selected routing node comprise the routing node in the at least one routing node, select the routing node in the at least one routing node as the next hop routing node; and
   in response to determining that the routing nodes connected to the selected routing node do not comprise the routing node in the at least one routing node, select a routing node conforming to the preset constraint condition from the routing nodes communicating with the second border node as the next hop routing node.

13. The routing controller according to claim 12, wherein the processor is further configured to:
   when data of a plurality of the second networks need to be transmitted to the first network, for the second network, determine a routing node conforming to the preset constraint condition from at least one unselected routing node connected to the selected routing node communicating with the second border node as the next hop routing node.

14. The routing controller according to claim 13, wherein the processor is further configured to:
   select a routing node communicating with the second border node, execute the following operation for each selected routing node until the selected routing node communicates with the first border node; and
   select a routing node conforming to the preset constraint condition from routing nodes communicating with the second border node as the next hop routing node.

15. The routing controller according to claim 14, wherein the processor is further configured to:
   select a routing node communicating with the second border node, execute the following operation for each selected routing node until the selected routing node communicates with the first border node; and
   select a routing node conforming to the preset constraint condition from routing nodes communicating with the second border node as the next hop routing node.

16. The routing controller according to claim 15, wherein the processor is further configured to:
   when data of a plurality of the second networks need to be transmitted to the first network, for the second network, determine a routing node conforming to the preset constraint condition from at least one unselected routing node communicating with the second border node as the next hop routing node.

17. A non-transitory computer readable medium storing instructions that, when executed by a processor, cause the process to provide the following method:
   receiving routing advertisement information from a first network to a second network, wherein the routing advertisement information includes information about routing nodes in a third network capable of providing paths connecting the first and second networks;
   determining a path between a first border node of the third network and a second border node of the third network according to the routing advertisement information,
      wherein the path comprises the first and second border nodes and one or more of the routing nodes of the third network that connects the first and the second border nodes so as to allow for communication between the first and second border nodes,
      wherein the first border node communicates with the first network, and the second border node communicates with the second network; and
   configuring a next hop routing node for each of the border and routing nodes in the determined path by sending to each of the border and routing nodes in the determined path a route between the node and its associated next hop routing node,
      wherein each of the border and routing nodes in the determined path is adjacent its associated next hop routing node,
      wherein each next hop routing node is a routing node not in the determined path; and
   wherein configuring the next hop routing node for the each of the border and routing nodes in the determined path provides each of the border and routing nodes in the determined path with an alternative path connecting the first and second border nodes.

18. The non-transitory computer readable medium according to claim 17, wherein determining the path between the first and second border nodes of the third network according to the routing advertisement information comprises:
   determining the routing nodes in the path according to the routing advertisement information and received routing plan information between the first and second border nodes,
      wherein plan nodes in the routing plan information comprise at least one routing node between the first and second border nodes, and the routing nodes in the determined path comprise the at least one routing node.

19. The non-transitory computer readable medium according to claim 17, wherein determining the path between the first and second border nodes of the third network according to the routing advertisement information comprises:
   determining a routing node between the first and second border nodes conforming to a preset constraint condition according to the routing advertisement information and received routing plan information between the first and second border nodes, wherein plan nodes in the routing plan information comprise at least one routing node between the first and second border nodes, and the routing nodes in the determined path comprise the at least one routing node.

20. The non-transitory computer readable medium according to claim 17, wherein determining the path between the first and second border nodes of the third network according to the routing advertisement information comprises:

determining a routing node between the first and second border nodes conforming to a preset constraint condition according to the routing advertisement information.

* * * * *